United States Patent
Hauzner et al.

(10) Patent No.: US 10,924,170 B2
(45) Date of Patent: Feb. 16, 2021

(54) SMOOTHING BEAMFORMING MATRICES ACROSS SUB-CARRIERS

(71) Applicant: CELENO COMMUNICATIONS (ISRAEL) LTD., Raanana (IL)

(72) Inventors: Shahar Hauzner, Givatayim (IL); Gregory Lerner, Petach-Tikva (IL); Avi Rapaport, Shoham (IL)

(73) Assignee: CELENO COMMUNICATIONS (ISRAEL) LTD., Raanana (IL)

( * ) Notice: Subject to any disclaimer, the term of this patent is extended or adjusted under 35 U.S.C. 154(b) by 61 days.

(21) Appl. No.: 16/271,913

(22) Filed: Feb. 11, 2019

(65) Prior Publication Data

US 2019/0260444 A1 Aug. 22, 2019

Related U.S. Application Data

(60) Provisional application No. 62/633,616, filed on Feb. 22, 2018.

(51) Int. Cl.
*H04B 7/06* (2006.01)
*H04B 7/0456* (2017.01)
(Continued)

(52) U.S. Cl.
CPC ......... *H04B 7/0617* (2013.01); *H04B 7/0456* (2013.01); *H04B 7/0634* (2013.01);
(Continued)

(58) Field of Classification Search
CPC .... H04B 7/043; H04B 7/0617; H04B 7/0639; H04B 7/0695; H04B 7/088; H04B 7/022;
(Continued)

(56) References Cited

U.S. PATENT DOCUMENTS 7,787,554 B1 8/2010 Nabar et al.
8,223,072 B2 7/2012 Ponnuswamy
(Continued)

OTHER PUBLICATIONS

A. Liu and V. Lau, "Phase only RF preceding for massive MIMO systems with limited RF chains", Sep. 2014, IEEE Transactions on Signal Processing, vol. 62, No. 17, pp. 4505-4515. (Year: 2014).*
(Continued)

*Primary Examiner* — Salvador E Rivas
(74) *Attorney, Agent, or Firm* — Kligler & Associates Patent Attorneys Ltd (57) ABSTRACT

A wireless transmitter includes a radio interface and transmitter circuitry. The radio interface includes multiple transmit antennas. The transmitter circuitry is configured to hold multiple steering matrices specifying weights to be applied to one or more spatial streams transmitted via the multiple transmit antennas to a receiver that includes one or more receive antennas, the multiple steering matrices are specified over multiple sub-carriers, to calculate smoothed weights, by applying to the weights of the steering matrices phase-only corrections that reduce phase variations among the weights of the steering matrices over the sub-carriers, and to transmit to the receiver beam-formed transmissions of the one or more spatial streams over the sub-carriers, by applying to the spatial streams the smoothed weights in the respective sub-carriers.

22 Claims, 2 Drawing Sheets

(51) Int. Cl.
*H04W 16/28* (2009.01)
*H04J 11/00* (2006.01)
*H04B 7/022* (2017.01)

(52) U.S. Cl.
CPC ........ *H04B 7/0663* (2013.01); *H04J 11/0053* (2013.01); *H04W 16/28* (2013.01); *H04B 7/022* (2013.01)

(58) Field of Classification Search
CPC .. H04B 7/0456; H04B 7/0634; H04B 7/0663; H04J 11/0053
See application file for complete search history.

(56) References Cited

U.S. PATENT DOCUMENTS

| | | | |
|---|---|---|---|
| 2007/0249296 A1* | 10/2007 | Howard | H04B 7/0421 455/101 |
| 2008/0076477 A1 | 3/2008 | Hedayat et al. | |
| 2008/0181170 A1 | 7/2008 | Branlund et al. | |
| 2008/0212461 A1 | 9/2008 | Pande et al. | |
| 2009/0080560 A1* | 3/2009 | Na | H04B 7/0634 375/267 |
| 2009/0195811 A1 | 8/2009 | Lee | |
| 2009/0270118 A1 | 10/2009 | Jin et al. | |
| 2009/0279494 A1 | 11/2009 | Halbauer et al. | |
| 2009/0290563 A1 | 11/2009 | Gu et al. | |
| 2010/0104038 A1 | 4/2010 | Stager et al. | |
| 2012/0163356 A1 | 6/2012 | Shapira et al. | |
| 2013/0109324 A1* | 5/2013 | Garrett | H04B 7/0408 455/73 |
| 2017/0170885 A1* | 6/2017 | Li | H04B 7/0413 |
| 2019/0081688 A1* | 3/2019 | Deenoo | H04L 5/0055 |

OTHER PUBLICATIONS

IEEE Standard 802.11n, "IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput", pp. 1-536, Oct. 29, 2009.

Ozdemir et al , "Channel estimation for wireless ofdm systems", IEEE Communications Surveys, vol. 9, No. 2, pp. 18-48, Apr. 1, 2007.

Shen et al., "MIMO-OFDM Beamforming for Improved Channel Estimation", IEEE Journal on Selected Areas in Communications, vol. 26, issue 6, pp. 948-959, Aug. 1, 2008.

802.11ac standard for Information technology—Local and metropolitan area networks—Specific requirements—Part 11: Wireless LAN Medium Access Control (MAC) and Physical Layer (PHY) Specifications Amendment 4: Enhancements for Very High Throughput for Operation in Bands below 6 GHz, pp. 1-425, year 2013.

IEEE P802.11axTM/D2.0, Part 11: Wireless LAN Medium Access Control (MAC) and Physical Layer (PHY) Specifications, Amendment 6: Enhancements for 5 High Efficiency WLAN, pp. 1-596, Oct. 2017.

Schoenberg, "Contributions to the problem of approximation of equidistant data by analytic functions: Part B—on the problem of osculatory interpolation. A second class of analytic approximation formulae," The Quarterly of Applied Mathematics, vol. 4, No. 2, pp. 112-141, Jul. 1946.

Schoenberg., "Contributions to the 25 problem of approximation of equidistant data by analytic functions: Part A—On the problem of smoothing or graduation. A first class of analytic approximation", The Quarterly of Applied Mathematics, vol. 4, No. 1, pp. 45-99, Apr. 1946.

* cited by examiner

SMOOTHING BEAMFORMING MATRICES ACROSS SUB-CARRIERS

CROSS-REFERENCE TO RELATED APPLICATIONS

This application claims the benefit of U.S. Provisional Patent Application 62/633,616, filed Feb. 22, 2018, whose disclosure is incorporated herein by reference.

TECHNICAL FIELD

Embodiments described herein relate generally to wireless communication, and particularly to methods and systems for smoothing among matrices that steer beam-formed transmissions, across multiple sub-carriers.

BACKGROUND

In wireless communications, the term "multiple-input multiple-output," or MIMO, refers to methods in which the communicating parties use multiple antennas to better exploit the radio channel. MIMO systems that support communicating with multiple users simultaneously are referred to as multi-user (MU)-MIMO systems.

The IEEE 802.11 is a family of standards in the field of wireless communication. Aspects of high throughput wireless local area network (WLAN) are specified, for example, in the 802.11ac-2013 standard entitled "IEEE Standard for Information technology—Local and metropolitan area networks—Specific requirements—Part 11: Wireless LAN Medium Access Control (MAC) and Physical Layer (PHY) Specifications Amendment 4: Enhancements for Very High Throughput for Operation in Bands below 6 GHz," 2013. The 802.11ac standard is also referred to as "very high throughput" (VHT). The IEEE 802.11ax standard, also known as "high-efficiency" (HE) is another member in the IEEE 802.11 family. A draft version of the 802.11ax standard is specified, for example, in "IEEE P802.11ax™/D2.0, Part 11: Wireless LAN Medium Access Control (MAC) and Physical Layer (PHY) Specifications, Amendment 6: Enhancements for High Efficiency WLAN," October 2017.

In some types of MIMO systems, transmissions via multiple antennas are shaped spatially, or precoded, using beamforming techniques, which are typically based on knowledge of the channel between the transmitter and receiver. In a paper entitled "MIMO-OFDM Beamforming for Improved Channel Estimation," IEEE Journal on Selected Areas in Communications, volume 26, issue 6, pages 948-959, Aug. 1, 2008, Shen et al. propose a beamforming method for improving channel estimation performance at the receiver, without degrading any benefit of a conventional beamformer.

SUMMARY

An embodiment that is described herein provides a wireless transmitter that includes a radio interface and transmitter circuitry. The radio interface includes multiple transmit antennas. The transmitter circuitry is configured to hold multiple steering matrices specifying weights to be applied to one or more spatial streams transmitted via the multiple transmit antennas to a receiver that includes one or more receive antennas, the multiple steering matrices are specified over multiple sub-carriers, to calculate smoothed weights, by applying to the weights of the steering matrices phase-only corrections that reduce phase variations among the weights of the steering matrices over the sub-carriers, and to transmit to the receiver beam-formed transmissions of the one or more spatial streams over the sub-carriers, by applying to the spatial streams the smoothed weights in the respective sub-carriers.

In some embodiments, the steering matrices correspond to a composite channel between the transmit antennas and the one or more receive antennas, and the transmitter circuity is configured to transmit the beam-formed transmissions to the receiver even though the receiver is allowed to perform receive-side sub-carrier smoothing in estimating the composite channel for equalization. In other embodiments, the transmitter circuitry is configured to calculate the smoothed weights for a given sub-carrier, based on smoothed weights already calculated for another sub-carrier. In yet other embodiments, the transmitter circuitry is configured to calculate the smoothed weights by calculating a dot-product between vectors of weights belonging respectively to the given sub-carrier and to the another sub-carrier.

In an embodiment, the transmitter circuitry is configured to apply a common phase correction to the weights belonging to a beamforming vector of the steering matrix corresponding to the given sub-carrier. In another embodiment, the circuity is configured to hold the steering matrices for only a partial subset of the sub-carriers used for transmission, and to calculate the smoothed weights for at least one sub-carrier not contained in the partial subset by interpolating among smoothed weights corresponding to multiple sub-carriers. In yet another embodiment, the transmitter circuitry is configured to apply, to multiple weights corresponding to a given transmit antenna and to a given spatial stream, a low pass filtering operation over multiple sub-carriers.

In some embodiments, the transmitter circuitry is configured to calculate the smoothed weights iteratively over a sequence of successive sub-carriers. In other embodiments, the transmitter circuitry is configured to calculate the steering matrices for multiple receivers based on feedback information received from the receivers, and to calculate the smoothed weights for applying simultaneous beam-formed transmissions to the multiple receivers.

There is additionally provided, in accordance with an embodiment that is described herein, a method for wireless communication, including, in a wireless transmitter including multiple transmit antennas, holding multiple steering matrices specifying weights to be applied to one or more spatial streams transmitted via the multiple transmit antennas to a receiver that includes one or more receive antennas, the multiple steering matrices are specified over multiple sub-carriers. Smoothed weights are calculated, by applying to the weights of the steering matrices phase-only corrections that reduce phase variations among the weights of the steering matrices over the sub-carriers frequencies.

Beam-formed transmissions of one or more spatial streams are transmitted to the receiver over the sub-carriers, by applying to the spatial streams the smoothed weights in the respective sub-carriers.

These and other embodiments will be more fully understood from the following detailed description of the embodiments thereof, taken together with the drawings in which:

DETAILED DESCRIPTION OF EMBODIMENTS

Overview

In multiple-input multiple-output (MIMO) beamforming, a transmitter focuses the transmission energy toward a receiver by applying certain weights to multiple transmit antennas. Determining the beamforming weights typically requires knowledge of the channel between the transmit antennas and receive antennas. In some wireless systems, the receiver estimates the channel response during a channel calibration procedure and reports it to the transmitter.

The channel response is characterized between each pair of transmit antenna and receive antenna over multiple predefined sub-carrier frequencies comprising the frequency band used. The sub-carrier frequencies are also referred to herein as "sub-carriers" for brevity. The receiver may report the channel response to the transmitter, for example, by reporting channel state information (CSI), or by applying to the estimated channel response a singular-value decomposition (SVD) operation, in which case the resulting V matrices over the sub-carriers may serve as beamforming matrices at the transmitter.

Embodiments that are described herein provide systems and methods for smoothing among beamforming matrices over the sub-carriers. Using the disclosed techniques enable applying beam-formed transmissions in combination with enhanced processing at the receiver, as will be described below. Beamforming matrices are also referred to herein as "steering matrices."

The receiver typically comprises an equalizer whose taps are updated based on continuous estimation of the channel response. To enhance reception performance, the receiver may apply smoothing (and possibly interpolation) to the estimated channel response over the sub-carriers. When the transmitter applies beamforming, however, smoothing the estimated channel response at the receiver side may degrade reception performance, because of possible discontinuities between beamforming matrices along the sub-carriers.

Discontinuities between beamforming matrices of adjacent sub-carriers may be caused, for example, due to column reordering of the V matrices as part of the SVD calculation, or due to reporting the channel response to the transmitter in a compressed form. Embodiments that will be described below provide smoothing techniques among the beamforming matrices at the transmitter, thus allowing the receiver to perform channel estimation with sub-carrier and interpolation, with improved performance. In an embodiment, the transmitter performs beamforming, but nevertheless indicates to the receiver that beamforming is not used.

In some embodiments, a transmitter such as an access point (AP) holds multiple beamforming matrices specifying weights to be applied to one or more spatial streams transmitted via the multiple transmit antennas, to a receiver that comprises one or more receive antennas. The multiple beamforming matrices are specified over multiple sub-carriers. The transmitter calculates smoothed weights, by applying to the weights of the beamforming matrices phase-only corrections that reduce phase variations among the weights of the beamforming matrices over the sub-carriers. By performing beam-formed transmissions using the smoothed weights, the receiver can apply sub-carrier smoothing and interpolation in estimating the channel response for equalization, resulting in improved reception performance.

In some embodiments, the transmitter calculates the smoothed weights for a given sub-carrier by calculating a dot-product between vectors of weights belonging respectively to the given sub-carrier and to an adjacent sub-carrier for which smoothed weights were already calculated. The transmitter applies a common phase correction factor, resulting from the dot-product operation, to the entire beamforming vector thus retaining the beamforming pattern specified by the non-smoothed beamforming matrices. In some embodiments, the transmitter calculates the smoothed weights iteratively over a sequence of successive sub-carriers.

In some embodiments, the beamforming matrices are available for only a partial subset of the sub-carriers used for transmission. In such embodiments, the transmitter calculates smoothed weights for the missing sub-carriers using interpolating methods such as the spline interpolation method. In an embodiment, the transmitter applies further smoothing to multiple weights of a given transmit antenna and a given spatial stream by applying a low pass filtering operation to the weights over multiple sub-carriers.

Using the disclosed techniques allows performing beamforming by the transmitter, toward low complexity and low cost receiver devices, with improved reception performance.

System Description

Figure 1:
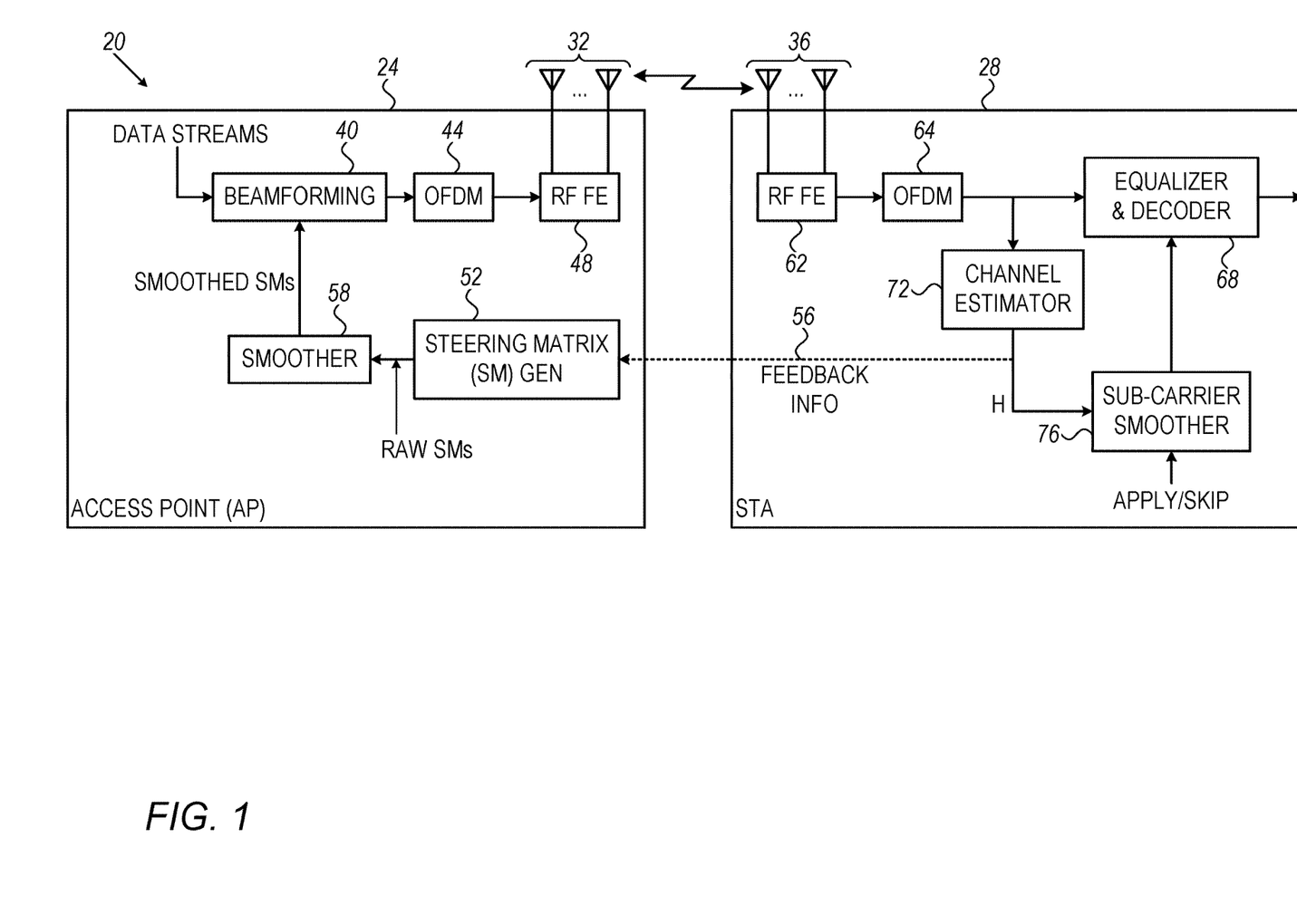
FIG. 1 is a block diagram that schematically illustrates a wireless communication system in which beam-formed transmissions are based on smoothed steering matrices, in accordance with an embodiment that is described herein.

FIG. 1 is a block diagram that schematically illustrates a wireless communication system 20 in which beam-formed transmissions are based on smoothed steering matrices, in accordance with an embodiment that is described herein. In the present example, communication system 20 comprises a wireless local area network (WLAN) that operates in accordance with an IEEE Standard of the 802.11 family, such as, for example, the IEEE 802.11ac standard or the IEEE 802.11ax standard cited above. In alternative embodiments, however, wireless communication system 20 may operate in accordance with any other suitable communication standard or protocol in which a transmitter performs beamforming using multiple beamforming matrices corresponding to multiple frequencies within the available frequency band.

In communication system 20, a predefined frequency band is divided into multiple sub-carrier frequencies, also referred to simply as "sub-carriers" for brevity. In some example embodiments, AP 24 may be configured to a channel having a bandwidth of 20 MHz, 40 MHz, 80 MHz or 160 MHz. In the 802.11ac standard, these frequency bands are divided into respective numbers 64, 128, 256 and 512 of sub-carriers, with sub-carrier spacing of 312.5 kHz. In the 802.11ax standard, these frequency bands are divided into respective numbers 256, 512, 1024, 2048 of sub-carriers, with sub-carrier spacing of 78.125 kHz.

Communication system 20 comprises an access point (AP) device 24, which communicates with one or more stations (STA) such as STA 28. STA 28 is also referred to as a "user device" or a "client device." AP 24 applies novel beamforming techniques, which are described in detail below, to enable improved reception in STA 28.

AP 24 comprises multiple antennas 32. Antennas 32 are sometimes referred to as a beamforming array, although the beamforming operation is typically performed on the signals that are provided to the antennas. In the downlink direction (DL), the AP typically transmits one or more beam-formed data transmissions, referred to as data streams, on directional transmission beams that are directed toward the STA(s) intended to receive the data streams. In some scenarios, the AP may transmit the data streams without applying beamforming, e.g., during channel calibration. The data streams are also referred to as "spatial streams" and may be provided to the AP by an external host computer (not shown) or generated internally within AP 24.

In order to transmit a data stream to a given STA, the AP generates a corresponding signal for transmission simultaneously via multiple antennas 32. AP 24 comprises a beamforming module 40 that applies to the signal a respective (complex valued) weight per each transmit antenna and sub-carrier. The set of weights per sub-carrier for a given spatial stream is referred to as a beamforming vector, and is selected so as to produce a directional beam that is directed toward the STA. In the present example, beamforming module 40 supports beamforming for multiple data streams, by applying a separate beamforming vector for each of the data streams. The beamforming vectors are sometimes arranged as columns of a matrix, which is referred to as a "beamforming matrix" or a "steering matrix" (SM). Beamforming module 40 typically applies a dedicated steering matrix for each sub-carrier.

In the downlink direction, bits output by beamforming module 40 are mapped to symbols, e.g., in accordance with a quadrature-amplitude modulation (QAM) scheme (not shown) and further mapped using an orthogonal frequency-division multiplexing (OFDM) modem 44 to multiple sub-carriers in the frequency domain. A radio frequency (RF) front end (FE) module 48 converts the signals to analog signals, which are transmitted via antennas 32. In the uplink direction, AP 24 receives uplink transmissions from one or more client devices such as STA 28, and demodulates these uplink transmissions to extract information sent from the client devices to the AP.

AP 24 comprises a steering matrix generator 52 that receives feedback information 56 from one or more STAs 28. The STA typically sends feedback information in response to a special frame transmitted by the AP for the purpose of channel calibration. Based on the feedback information, steering matrix generator 52 calculates multiple steering matrices (SMs) for multiple respective sub-carriers. The matrices output by the steering matrix generator are also referred to herein as "raw steering matrices" that are subject to smoothing over the sub-carriers, as will be described in detail below.

In some embodiments, the complex valued weights in the raw steering matrices exhibit unsmooth behavior over the multiple sub-carriers. For example, weights corresponding to a given transmit antenna and to a given spatial stream may have a phase and/or amplitude discontinuity between steering matrices of adjacent sub-carriers. AP 24 comprises a smoother 58, which processes the raw steering matrices to improve the smoothness among the steering matrices over the sub-carriers.

In the context of the present disclosure, the term "smoothness" refers to the amount of variation between corresponding elements (i.e., elements having the same row and column indices) of the steering matrices belonging to adjacent sub-carriers. As such, the overall smoothness is improved by reducing the variation between corresponding elements of the raw steering matrices belonging to neighboring sub-carriers.

Smoothness can be measured in various ways. For example, the variation of a given matrix element (weight) between steering matrices of adjacent sub-carriers is measured, e.g., in terms of a phase difference, amplitude difference or absolute value difference. The smoothness for the given matrix element across multiple sub-carriers is defined by some suitable function applied to the individual smoothness values of the given element over the sub-carriers. The function may, for example, select the maximal variation, or calculate an average variation over the sub-carriers. Alternatively or additionally, the function may calculate some statistical measure, e.g., variance or standard deviation over the sub-carriers. Smoothness can be also be calculated collectively for multiple matrix elements, for example, by taking the maximal value or averaging over the smoothness values of multiple individual matrix elements.

STA 28 comprises one or more antennas 36, which in the downlink direction function as receive antennas. An RF FE module 62 receives signals transmitted by AP 24, and converts the received signals to digital form, e.g., after conversion to baseband. In the present example, an OFDM modem 64 in STA 28 demodulates the OFDM symbols in the received signals to recover the data transmitted to the STA.

An equalizer and decoder module 68 applies signal equalization to compensate for the channel between the AP's and STA's antennas, and decodes the data from the equalized signal. Accurate equalization is required for separating between the multiple spatial streams destined to the STA. In an embodiment, the STA estimates the taps of the equalizer from a channel response estimated by a channel estimator 72 followed by a sub-carrier smoother 76, as described herein.

Channel estimator 72 estimates radio channels between transmit antenna 32 of the AP and receive antennas 36 of the STA. The channel response for a given pair of transmit and receive antennas typically comprises multiple complex-valued numbers specifying gain and phase information for multiple respective sub-carriers. The channel response corresponding to multiple pairs of transmit and receive antennas is also referred to herein as a "composite channel response."

Sub-carrier smoother 76 applies to the channel response estimated by channel estimator 72 a smoothing operation using any suitable smoothing method. For example, sub-carrier smoother 76 applies a low pass filter or a moving-window filter to the channel response over the sub-carriers. Sub-carrier smoother 76 may also perform sub-carrier interpolation, e.g., to improve frequency resolution, or when the channel response is estimated for a partial subset of the sub-carriers, e.g., due to complexity limitations. The STA calculates the taps of the equalizer in module 68 based on the smoothed channel response, which improves the receiver performance, in some situations. In some embodiments, the STA skips the smoothing operation by bypassing sub-carrier smoother 76, in which case the equalizer taps are derived from the channel response output by the channel estimator.

As noted above, the AP receives from the STA feedback information 56 for calculating steering matrices to be used in subsequent beam-formed transmissions. The feedback information is related to the composite channel response estimated by channel estimator 72, and can be reported to the AP in various ways. For example, the feedback information may comprise Channel state information (CSI) or an SVD-based report, as will be described below.

The CSI typically comprises multiple channel matrix elements that each characterizes gain and phase attributes representing a channel response function between a pair of transmit antenna and a receive antenna. Each channel matrix element is characterized across multiple complex-valued coefficients, corresponding to respective OFDM sub-carriers.

SVD-based feedback is generated by applying a Singular Value Decomposition (SVD) operation to a channel response matrix, resulting in multiple V matrices for multiple respective sub-carriers. In some embodiments, the STA performs SVD to the estimated channel response and reports the resulting V matrices to the AP. In the present example, the SVD operation is carried out at the receiver side, i.e., within STA 28. In alternative embodiments, the SVD operation is carried out by AP 24. In yet other embodiments (not compliant with the IEEE 802.11 family of standards), the AP receives the raw steering matrices or information from which the steering matrices can be derived from some central entity in the communication network.

In some embodiments, in a single-user mode of operation, the AP uses the V matrices as steering matrices. In such embodiments, the matrix elements of the V matrices are used as the raw steering matrices. In other embodiments, in a multi-user mode of operation, the AP constructs from the V matrices steering matrices Q, and used the Q matrices for performing beamforming to multiple client devices simultaneously. In these embodiments, smoother 58 (e.g., as described in FIG. 2 above) can be applied to the Q matrices instead of the V matrices.

The configuration of communication system 20, AP 24 and STA 28 of FIG. 1 are given by way of example and other communication system, transmitter and receiver configurations can also be used.

Some elements of AP 24, such as beamforming module 40, OFDM modem 44, steering matrix generator 52 and smoother 58, as well as some elements of STA 28 such as OFDM modem 64, equalizer & decoder 68, channel estimator 72 and sub-carrier smoother 76 may be implemented in hardware, e.g., in one or more Application-Specific Integrated Circuits (ASICs) or Field-Programmable Gate Arrays (FPGAs). Additionally or alternatively, some elements of the AP and some elements of the STA can be implemented using software, or using a combination of hardware and software elements.

In some embodiments, some of the functions of the AP and some functions of the STA may be carried out by a respective general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the context of the present patent application and in the claims, the term "transmitter circuitry" refers to all the elements of AP 24 excluding RF FE 48. In FIG. 1, the transmitter circuitry comprises beamforming module 40, OFDM modem 44, steering matrix generator 52 and smoother 58. In the context of the present patent application and in the claims, the term "receiver circuitry" refers to all the elements of STA 28 excluding RF FE 62. In FIG. 1, the receiver circuitry comprises OFDM modem 64, equalizer & decoder 68, channel estimator 72 and sub-carrier smoother 76.

Methods for Smoothing Steering Matrices

Consider a MIMO communication system such as communication system 20, in which an AP having a number $N_{TX} > 1$ of transmit antennas, communicates with a STA having a number $N_{RX} \geq 1$ of receive antennas. In addition, the STA communicates with the STA over a frequency band comprising a number Nsc of sub-carriers.

Let H denote the composite channel matrix between the transmit antennas and the receive antennas. For each sub-carrier SC, the channel matrix H comprises $N_{TX}$-by-$N_{RX}$ elements and is denoted $H^{sc}$. In some embodiments, the AP transmits $N_{SS}$ spatial streams to the STA in a sounding frame for channel calibration. In response to the sounding frame, the STA estimates the channel matrices $H^{sc}$ and calculates $V^{sc}$ matrices using SVD as follows:

$$H^{sc} = U^{sc} \cdot S^{sc} \cdot (V^{sc})^* \qquad \text{Equation 1}$$

In Equation 1, $H^{sc}$ is $N_{RX}$-by-$N_{TX}$, $U^{SC}$ is $N_{RX}$-by-$N_{RX}$, $S^{sc}$ is a $N_{RX}$-by-$N_{TX}$ diagonal matrix, and $V^{sc}$ is $N_{TX}$-by-$N_{TX}$. The matrix $S^{sc}$ is real valued, whereas the matrices $U^{sc}$ and $V^{sc}$ are complex-valued and unitary matrices. The operator ( )* in Equation 1 denotes a transpose and conjugate operator. In some embodiments, the STA reports to the AP the first $N_{SS}$ columns of $V^{sc}$ corresponding to the $N_{SS}$ strongest eigenvalues in $S^{sc}$, for all sub-carriers sc=0 ... Nsc−1.

In some embodiments, to improve smoothness among the $V^{sc}$ matrices over the sub-carriers, smoother 58 of the AP performs an iterative calculation for deriving smoothed steering matrices denoted $\overline{V}^0 \ldots \overline{V}^{Nsc-1}$. The iterative process starts with the AP defining $\overline{V}^0 = V^0$, and then calculating each smoothed matrix $\overline{V}^{sc}$ as a function of $\overline{V}^{sc-1}$ and $V^{sc}$, for sc=1 ... Nsc−1.

Figure 2:
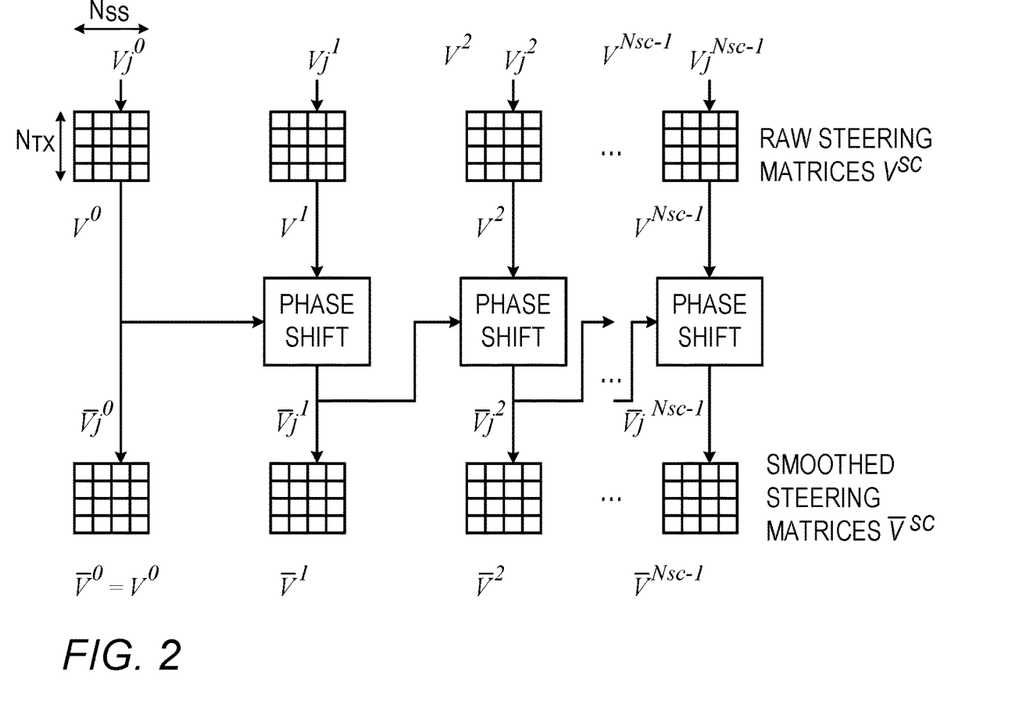
FIG. 2 is a diagram that schematically illustrates a method for smoothing steering matrices over sub-carriers, in accordance with an embodiment that is described herein.

FIG. 2 is a diagram that schematically illustrates a method for smoothing steering matrices over sub-carriers, in accordance with an embodiment that is described herein. The method may be performed by smoother 58 of AP 24.

The method starts with smoother 58 receiving a number Nsc of steering matrices denoted $V^0 \ldots V^{Nsc-1}$ In the present example, the steering matrices are the $V^{sc}$ raw matrices calculated based on the estimated channel matrices $H^{sc}$ using SVD, as described in Equation 1 above.

The smoother initializes the smoothed matrix for sc=0 to the corresponding steering matrix, as given by:

$$\overline{V}^0 = V^0 \qquad \text{Equation 2}$$

Equation 2 can be specified in terms of matrix columns as follows:

$$\overline{V}_j^0 = V_j^0, j=0 \ldots Nss-1 \qquad \text{Equation 3}$$

Next, the smoother performs an iterative loop over the sub-carriers sc=1 ... Nsc−1. In each iteration, the smoother handles a sub-carrier sc, and applies a common phase correction to all the elements of each column $Vj^{sc}$ to produce the smoothed version $\overline{V}j^{sc}$ of the beamforming vector. In some embodiments, the smoother applies the phase correction to the elements of the $j^{th}$ column. In applying the phase correction, the smoother applies a phase shift operation to the elements of the column by multiplying the elements by a phase-correction factor $\alpha_j^{sc}$ as given by:

$$\overline{V}_{ij}^{sc} = \alpha_j^{sc} \cdot V_{ij}^{sc}, i=0 \ldots NT^{TX}-1 \qquad \text{Equation 4}$$

wherein the phase correction factor for the $j^{th}$ column (and sub-carrier sc) has a complex value of a unity magnitude given by $$\alpha_j^{sc} = \beta_j^{sc} / |\beta_j^{sc}| \qquad \text{Equation 5}$$

The smoother calculates $\beta_j^{sc}$ in Equation 5 as a dot-product between the column vectors $\overline{V}j^{sc-1}$ and $Vj^{sc}$ as follows:

$$\beta_j^{sc} = \sum_{i=0}^{N_{TX}-1} \overline{V} ij^{sc-1} \cdot (Vij^{sc})^*, \ j = 0 \ldots Nss - 1 \quad \text{Equation 6}$$

After applying phase correction to all the columns $V_j^{sc}$, the smoother proceeds to the next iteration in which the smoother increments the sub-carrier index sc by one, and the smoother repeats the calculations in Equations 4-6 for the updated sub-carrier.

The dot-product $\beta_j^{sc}$ in Equation 6 typically results in a complex valued number having a phase value that approximates the average phase-difference between the $\overline{V}j^{sc-1}$ and $Vj^{sc}$. Therefore, by applying phase correction as given in Equation 5, the average phase difference between $\overline{V}j^{sc-1}$ and $\overline{V}j^{sc}$ reduces significantly, compared to the average phase difference between $\overline{V}j^{sc-1}$ and $Vj^{sc}$. By building the smoothed matrices iteratively, as described above, the smoothness over the entire sub-carriers improves significantly.

Note that since the phase correction factor $\alpha_j^{sc}$ is a pure phase factor that has a unity magnitude, and since this factor is applied at a column level, the phase correction operation in Equation 4 does not affect the unitary properties of the matrices $V^{sc}$ and therefore the phase correction operation does not modify the beamforming pattern specified by the raw steering matrices.

Steering Matrices Smoothing and Interpolation

Figure 3:
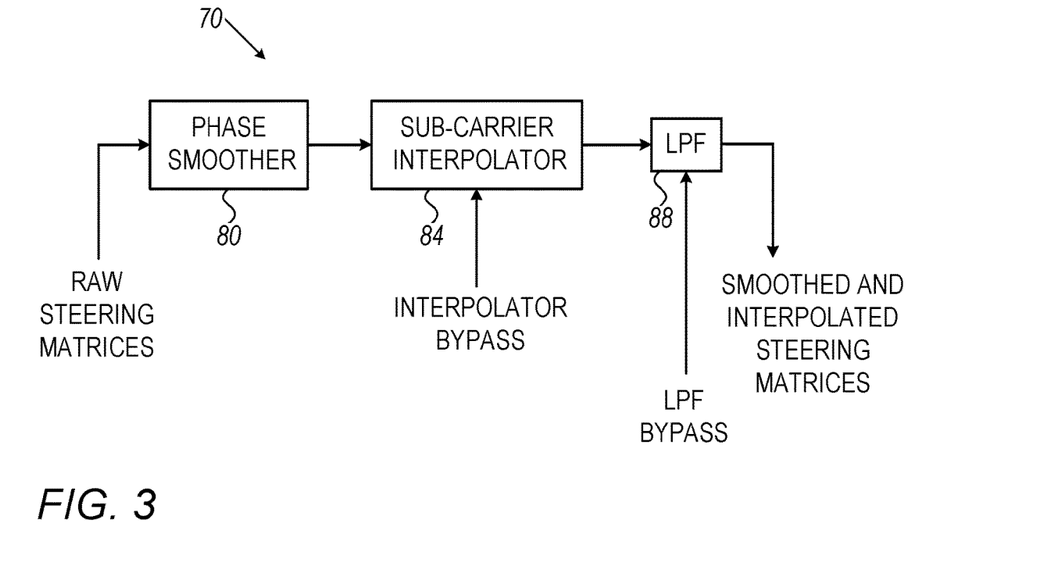
FIG. 3 is a block diagram that schematically illustrates a smoother that supports sub-carrier interpolation and low pass filtering, in accordance with an embodiment that is described herein.

FIG. 3 is a block diagram that schematically illustrates a smoother 70 that supports sub-carrier interpolation and low pass filtering, in accordance with an embodiment that is described herein. The smoother of FIG. 3 can be used, for example, in implementing smoother 58 of AP 24.

Smoother 70 comprises a phase smoother 80, a sub-carrier interpolator 84 and a low pass filter (LPF) 88. Smoother 70 receives multiple steering matrices, e.g., from steering matrix generator 52. The steering matrices may comprise SVD-based matrices $V^{sc}$ calculated from an estimated channel matrix as given in Equation 1 above. Phase smoother 80 receives the multiple steering matrices and produces multiple smoothed steering matrices $\overline{V}^{sc}$ by modifying only the phase component of the complexed-valued weights in the raw steering matrices. In some embodiments, phase smoother 80 is implemented based on the smoothing method described in FIG. 2 above.

In some embodiments, the raw steering matrices are received for a partial subset of the entire sub-carriers used sc=0 . . . Nsc-1. For example, for reducing the amount of feedback information that the STA reports to the AP, the STA may include in the feedback information channel related information for a partial subset of the full set sc=0 . . . Nsc-1. For example, the STA reports the matrices $V^{sc}$ for a decimated set of sub-carriers in the range 0 . . . Nsc-1, such as decimating the full sequence of sub-carrier indices by some factor Ng>1. As an example, when using a decimation factor of two (Ng=2) the STA reports only half of the $V^{sc}$ matrices for the sub-carriers having the sub-carrier indices sc=0, 2, 4, . . . , Nsc-1.

In some embodiments, sub-carrier interpolator 84 calculates the unavailable steering matrices using any suitable interpolation technique. In one embodiment, sub-carrier interpolator 84 interpolates among the smoothed steering matrices output by phase smoother 80.

The sub-carrier interpolator can generate the missing steering matrices using Zero Order Hold (ZOH) interpolation, by replicating a steering matrix. For example, when the decimation factor is Ng=4, for sub-carrier indices of the form sc=4n+1, sc=4n+2 and sc=4n+3, sub-carrier interpolator 84 generates the matrices $V^{4n+1}$, $V^{4n+2}$ and $V^{4n+3}$ as replicas of the matrix $V^{4n}$. In other embodiments, other interpolation methods can be used, such as, for example a "spline interpolation" method, which is based on piecewise polynomial interpolation. In an embodiment, sub-carrier interpolator 84 applies the spline interpolation over the sub-carrier indices individually for each steering matrix element.

The spline interpolation method is described, for example, by I. J. Schoenberg, in "Contributions to the problem of approximation of equidistant data by analytic functions: Part A-On the problem of smoothing or graduation. A first class of analytic approximation," The Quarterly of Applied Mathematics, volume 4, Number 1, April 1946, pages 45-99, and in "Contributions to the problem of approximation of equidistant data by analytic functions: Part B-on the problem of osculatory interpolation. A second class of analytic approximation formulae," The Quarterly of Applied Mathematics, volume 4, Number 2, July 1946, pages 112-141.

LPF 88 provides further smoothing to the steering matrices. The LPF can be implemented using any suitable method such as using a finite impulse response (FIR) filter. In an embodiment, the LPF is applied separately for each matrix element across the sub-carriers. The impulse response coefficients of an example FIR that can be used are given in Table 1.

TABLE 1

| FIR coefficients for the smoother LPF | | | | | | | | | | | |
|---|---|---|---|---|---|---|---|---|---|---|---|
| Coef | 0 | 1 | 2 | 3 | 4 | 5 | 6 | 7 | 8 | 9 | 10 |
| value | -2 | 0 | 16 | 60 | 113 | 138 | 113 | 60 | 16 | 0 | -2 |

The smoothed matrices at the output of LPF 88 are generally not guaranteed to be unitary matrices, and therefore applying the LPF typically results in a modified beamforming pattern compared to the original beamforming pattern defined by the raw steering matrices. Using the LPF smoothing thus degrades the beamforming gain, but may still be advantageous, because of the smoothing effect of the LPF that improves the overall performance.

The elements of smoother 70 may be applied in various ways. For example, each of sub-carrier interpolator 84 and LPF 88 can be included in the processing chain, or alternatively bypassed. For example, when the complete set of steering matrices is available, e.g., Ng=1, no interpolation is required, and the sub-carrier interpolation operation should be omitted. As another example, when sub-carrier interpolator 84 applies the spline interpolation method, no further smoothing is required, and LPF 88 is bypassed, in an embodiment.

Performance Evaluation

The inventors have evaluated the embodiments described above using computer simulations. The goal was to identify communication configurations that include beamforming at the transmitter plus smoothing and interpolation of the channel response estimated for equalization at the receiver, which configurations achieve best reception performance.

Detailed simulation results are given in U.S. Provisional Patent Application 62/633,616, cited above.

The main simulation parameters used under the 802.11ac (VHT) and the 802.11ax (HE) standards are summarized in Table 2 and Table 3 below.

TABLE 2 simulation parameters for 802.11ac (VHT)

| | |
|---|---|
| Number of AP Tx antennas | 4 |
| Number of STA Rx antennas | 1, 2, 4 |
| Sub-carrier decimation factor | Ng = 1, 4 |
| Channel bandwidth | 80 MHz |
| Channel type | Type D |
| Modulation scheme and coding | MCS 7/BCC |
| Packet length in bytes | 2048 |

TABLE 3 simulation parameters for 802.11ax (HE)

| | |
|---|---|
| Number of AP Tx antennas | 4, 6 |
| Number of STA Rx antennas | 1, 2, 4 |
| Sub-carrier decimation factor | Ng = 1, 4, 16 |
| Channel bandwidth | 80 MHz |
| Channel type | Type D |
| Modulation scheme and coding | MCS 7/LDPC |
| Packet length in bytes | 2048 (4 Tx antennas) |
| | 12288 (6 Tx antennas) |
| HE Long Training Field | HE-LTFx4 |
| Boost Factor | 1, 2 (for 4, 6 Tx antennas) |
| AP mode | SU full BW mode |

In comparing various transmitter and receiver configurations, the performance criterion used is the error vector magnitude (EVM) criterion, which measures the distance of the constellation points at the receiver relative to their ideal locations. EVM is typically measured in units of dB.

Table 4 below summarizes the approximate best gain achieved in the simulations.

TABLE 4

Best EVM gain achieved in simulations

| | | EVM gain (dB) | | |
|---|---|---|---|---|
| NRX | Nss | VHT NTX = 4 | HE NTX = 4 | HE NTX = 6 |
| 1 | 1 | 1.7 | 2.5 | 2.0 |
| 2 | 1 | 1.8 | 2.0 | 2.0 |
| 2 | 2 | 1.8 | 2.0 | 2.2 |
| 4 | 1 | 1.8 | 2.0 | 2.2 |
| 4 | 2 | 1.8 | 2.0 | 2.5 |
| 4 | 3 | 1.6 | 1.8 | 2 |
| 4 | 4 | NA | NA | 2.2 (for $N_{TX} = 4$) |
| | | | | 2.0 (for $N_{TX} = 16$) |

The embodiments described above are given by way of example, and other suitable embodiments can also be used. For example, although the embodiments above refer mainly to single-user (SU) MIMO communication, the embodiments can be used similarly in multi-user (MU) MIMO communication as well. In such embodiments, the AP calculates steering matrices denoted Q based on the feedback information from the receiver, so that the transmission power is spatially shaped for best reception by multiple user devices. In embodiments of this sort, the AP first calculates the Q steering matrices from the user-dedicated non-smoothed steering matrices V, and then applies smoother 58 to the Q steering matrices.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A wireless transmitter, comprising:
a radio interface comprising multiple transmit antennas; and
transmitter circuitry, configured to:
hold multiple steering matrices specifying weights to be applied to one or more spatial streams transmitted via the multiple transmit antennas to a receiver that comprises one or more receive antennas, wherein the multiple steering matrices are specified over multiple sub-carriers;
calculate smoothed weights, by applying to the weights of the steering matrices phase-only corrections that reduce phase variations among the weights of the steering matrices over the sub-carriers; and
transmit to the receiver beam-formed transmissions of the one or more spatial streams over the sub-carriers, by applying to the spatial streams the smoothed weights in the respective sub-carriers,
wherein the transmitter circuitry is configured to calculate the smoothed weights by multiplying the weights by complex values of a unity magnitude.

2. The wireless transmitter according to claim 1, wherein the steering matrices correspond to a composite channel between the transmit antennas and the one or more receive antennas, and wherein the transmitter circuitry is configured to transmit the beam-formed transmissions to the receiver with an indication that the receiver is allowed to perform receive-side sub-carrier smoothing in estimating the composite channel for equalization.

3. The wireless transmitter according to claim 1, wherein the transmitter circuitry is configured to calculate the smoothed weights for a given sub-carrier, based on smoothed weights already calculated for another sub-carrier.

4. The wireless transmitter according to claim 3, wherein the transmitter circuitry is configured to calculate the smoothed weights by calculating a dot-product between vectors of weights belonging respectively to the given sub-carrier and to the another sub-carrier.

5. The wireless transmitter according to claim 3, wherein the transmitter circuitry is configured to apply a common phase correction to the weights belonging to a beamforming vector of the steering matrix corresponding to the given sub-carrier.

6. The wireless transmitter according to claim 1, wherein the circuitry is configured to hold the steering matrices for only a partial subset of the sub-carriers used for transmission, and to calculate the smoothed weights for at least one sub-carrier not contained in the partial subset by interpolating among smoothed weights corresponding to multiple sub-carriers.

7. The wireless transmitter according to claim 1, wherein the transmitter circuitry is configured to apply, to multiple weights corresponding to a given transmit antenna and to a given spatial stream, a low pass filtering operation over multiple sub-carriers.

8. The wireless transmitter according to claim 1, wherein the transmitter circuitry is configured to calculate the smoothed weights iteratively over a sequence of successive sub-carriers.

9. The wireless transmitter according to claim 1, wherein the transmitter circuitry is configured to calculate the steering matrices for multiple receivers based on feedback information received from the receivers, and to calculate the smoothed weights for applying simultaneous beam-formed transmissions to the multiple receivers.

10. The wireless transmitter according to claim 1, wherein the transmitter circuitry is configured to calculate the smoothed weights for a given sub-carrier, by multiplying the weights of the given sub-carrier by an adjustment value calculated as a function of weights of the given sub-carrier and weights of an adjacent sub-carrier.

11. The wireless transmitter according to claim 1, wherein the transmitter circuitry is configured to calculate the smoothed weights for a given sub-carrier by applying a common phase correction to all the elements of each column of the corresponding matrix of the sub-carrier.

12. A method for wireless communication, comprising:
in a wireless transmitter comprising multiple transmit antennas, holding multiple steering matrices specifying weights to be applied to one or more spatial streams transmitted via the multiple transmit antennas to a receiver that comprises one or more receive antennas, wherein the multiple steering matrices are specified over multiple sub-carriers;
calculating smoothed weights, by applying to the weights of the steering matrices phase-only corrections that reduce phase variations among the weights of the steering matrices over the sub-carriers; and
transmitting to the receiver beam-formed transmissions of one or more spatial streams over the sub-carriers, by applying to the spatial streams the smoothed weights in the respective sub-carriers,
wherein calculating the smoothed weights comprises multiplying the weights by complex values of a unity magnitude.

13. The method according to claim 12, wherein the steering matrices correspond to a composite channel between the transmit antennas and the one or more receive antennas, and wherein transmitting the beam-formed transmissions comprises transmitting the beam-formed transmissions to the receiver even though the receiver is allowed to perform receive-side sub-carrier smoothing in estimating the composite channel for equalization.

14. The method according to claim 12, wherein calculating the smoothed weights comprises calculating the smoothed weights for a given sub-carrier, based on smoothed weights already calculated for another sub-carrier.

15. The method according to claim 14, wherein calculating the smoothed weights comprises calculating a dot-product between vectors of weights belonging respectively to the given sub-carrier and to the another sub-carrier.

16. The method according to claim 14, wherein calculating the smoothed weights comprises applying a common phase correction to the weights belonging to a beamforming vector of the steering matrix corresponding to the given sub-carrier.

17. The method according to claim 12, wherein holding the steering matrices comprises holding the steering matrices for only a partial subset of the sub-carriers used for transmission, and wherein calculating the smoothed weights comprises calculating the smoothed weights for at least one sub-carrier not contained in the partial subset by interpolating among smoothed weights corresponding to multiple sub-carriers.

18. The method according to claim 12, wherein calculating the smoothed weights comprises applying, to multiple weights corresponding to a given transmit antenna and to a given spatial stream, a low pass filtering operation over multiple sub-carriers.

19. The method according to claim 12, wherein calculating the smoothed weights comprises calculating the smoothed weights iteratively over a sequence of successive sub-carriers.

20. The method according to claim 12, wherein holding the steering matrices comprises calculating the steering matrices for multiple receivers based on feedback information received from the receivers, and wherein calculating the smoothed weights comprises calculating the smoothed weights for applying simultaneous beam-formed transmissions to the multiple receivers.

21. The method according to claim 12, wherein calculating the smoothed weights comprises multiplying the weights of a given sub-carrier by an adjustment value calculated as a function of weights of the given sub-carrier and weights of an adjacent sub-carrier.

22. The method according to claim 12, wherein calculating the smoothed weights comprises applying, for a given sub-carrier, a common phase correction to all the elements of each column of the corresponding matrix of the sub-carrier.

* * * * *